United States Patent [19]

Kim

[11] Patent Number: 4,807,242
[45] Date of Patent: Feb. 21, 1989

[54] GAS LASER DISCHARGE TUBE

[76] Inventor: Simon M. Kim, 65 - E. 39th Avenue, Vancouver, B.C., Canada, V5W 1J6

[21] Appl. No.: 76,184

[22] Filed: Jul. 21, 1987

[51] Int. Cl.$^4$ .................................................. H01S 3/097
[52] U.S. Cl. ...................................... 372/87; 372/61
[58] Field of Search ....................... 372/61, 87, 88, 92, 372/34

[56] References Cited

U.S. PATENT DOCUMENTS

| | | | |
|---|---|---|---|
| 3,784,929 | 1/1974 | Joy, Jr. et al. | 331/94.5 |
| 4,168,473 | 9/1979 | Black, Jr. | 372/9 |
| 4,235,372 | 11/1980 | Salter | 239/11 |
| 4,500,998 | 2/1985 | Kuwabara et al. | 372/61 |
| 4,534,032 | 8/1985 | Hoag | 372/34 |
| 4,611,329 | 8/1986 | Ernst et al. | 372/88 |
| 4,612,646 | 8/1986 | Zerr | 372/58 |
| 4,752,935 | 6/1988 | Beck | 372/55 |

FOREIGN PATENT DOCUMENTS

| | | | |
|---|---|---|---|
| 1200001 | 1/1986 | Canada | 345/38 |
| 3408075 | 9/1985 | Fed. Rep. of Germany | 372/65 |
| 3520989 | 12/1986 | Fed. Rep. of Germany | 372/87 |
| 0159779 | 7/1986 | Japan | 372/87 |
| 0208883 | 9/1986 | Japan | 372/87 |
| 0002579 | 1/1987 | Japan | 372/61 |
| 2172739 | 9/1986 | United Kingdom | 372/61 |
| 2187593 | 9/1987 | United Kingdom | 372/61 |

Primary Examiner—William L. Sikes
Assistant Examiner—B. Randolph
Attorney, Agent, or Firm—Chernoff, Vilhauer, McClung & Stenzel

[57] ABSTRACT

A high power gas laser and, in particular, a high power continuous wave gas laser. The discharge chamber of the laser has a plurality of first electrodes. The electrodes of opposite polarity take the form of a coil. The first electrodes take the form of a plurality of metal pins protruding from the wall of the discharge chamber. Gas is introduced into the discharge chamber tangentially which circulates with a vortex type motion from the upstream introduction point to the exit chamber where it is split and exits by a conical flow divider. A portion of the gas travels from the flow divider upstream due to the back pressure of the flow divider resulting in improved vortex flow in the discharge chamber and exits at the upstream end. The discharge chamber of the laser may assume a conical configuration.

15 Claims, 8 Drawing Sheets

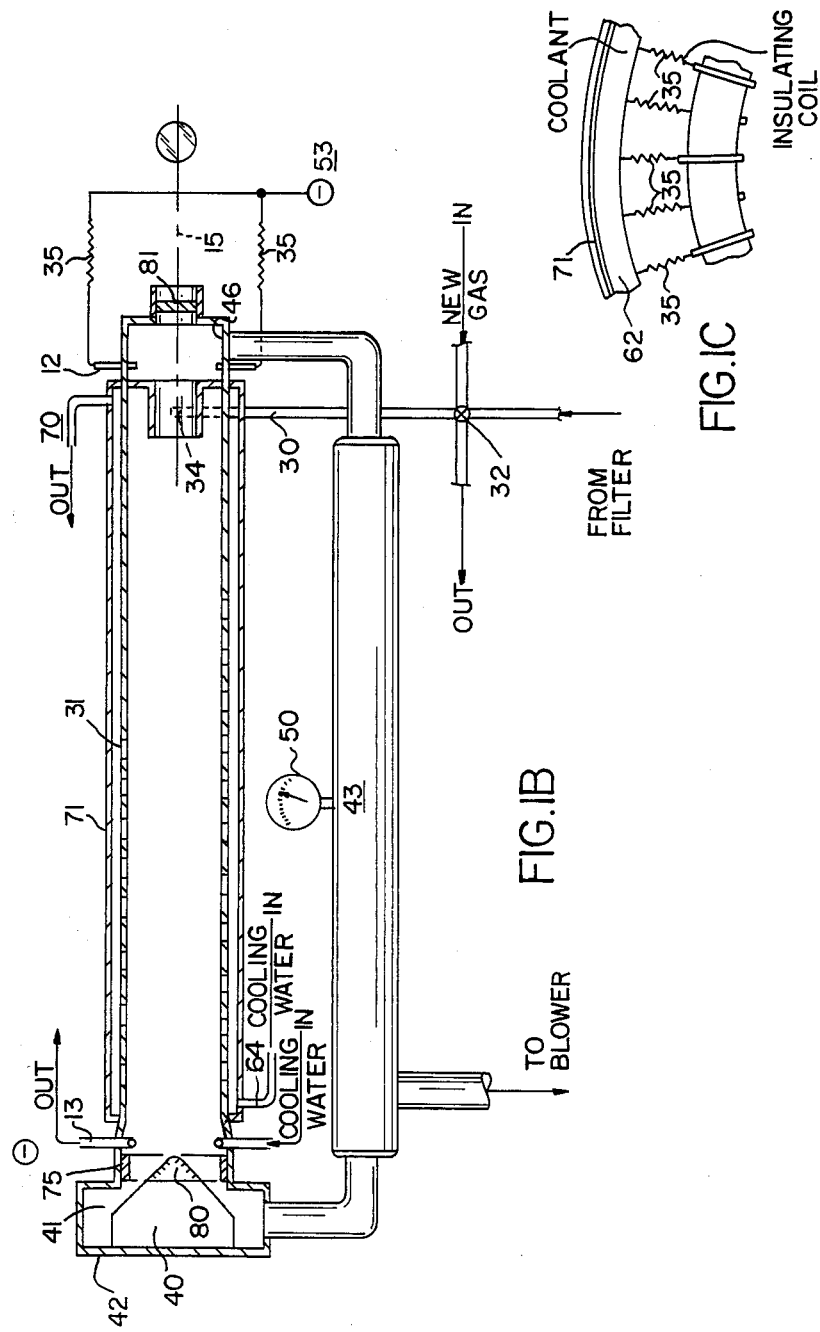

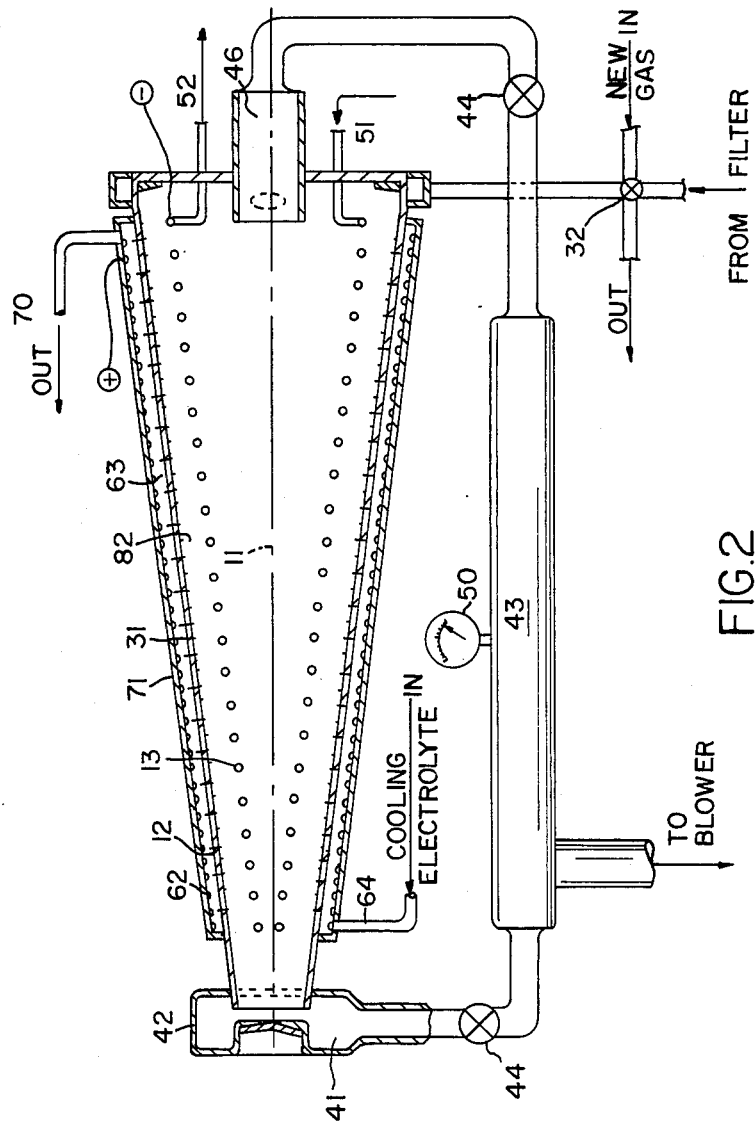

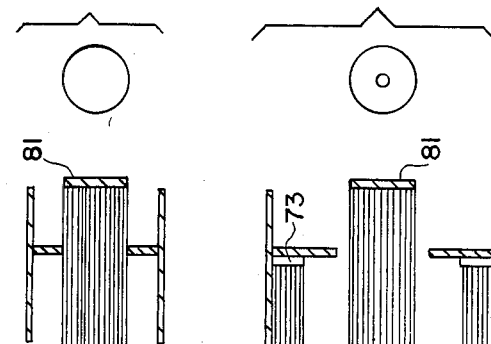
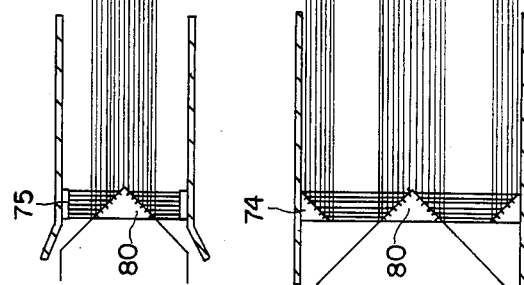
FIG.5A
FIG.5B

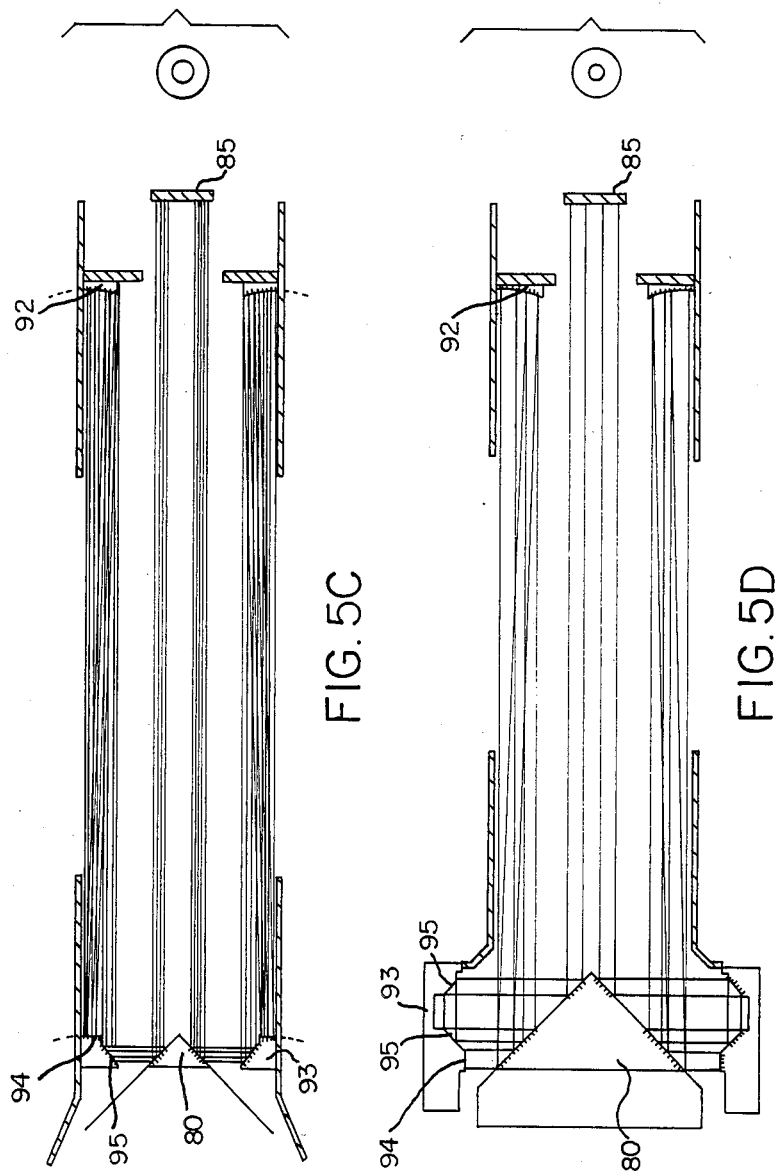

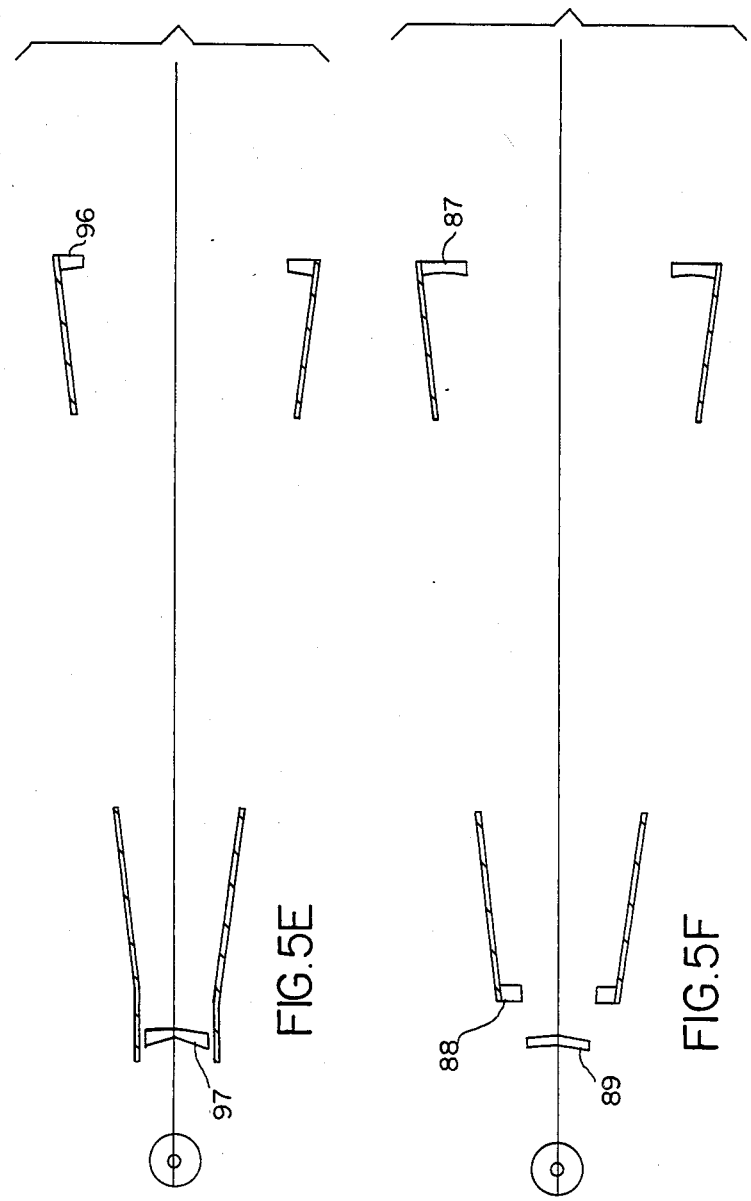

GAS LASER DISCHARGE TUBE

INTRODUCTION

This invention relates to a gas laser and, more particularly, to a high power continuous wave gas laser.

BACKGROUND OF THE INVENTION

A stable electrical discharge is an important element desirable in the discharge chamber of a high power gas laser. It is known, for example, that the highest power operation in a gas laser system is generally limited by the discharge instability which manifests itself as a collapse from a distributed glow to a constricted arc within the discharge area. This collapse results in termination of laser discharge. Many methods have been used in the past in an attempt to improve the discharge stability and to overcome the glow breakdown.

In a typical high power gas laser operation, as much as 97% of the power input to the laser system may be dissipated as heat. Unless this heat is removed from the system, the increasing energy level of unexcited molecules caused by thermal energy is so great in the lower energy level that lasing action will eventually cease. It is desirable, therefore, to have relatively high speed gas flow within the discharge chamber for effective heat removal. High speed gas flow also helps to constrict an arc formation that may occur within the discharge chamber.

Pre-ionization is required in a laser discharge chamber in order to properly obtain the necessary uniform discharge. Applying direct current (D.C.) on the electrode is not sufficient to initiate and maintain a stable discharge. To obtain the necessary pre-ionization, various techniques have been utilized. Some of the methods used are photo-ionization, electron-beam and pulse-enhanced pre-ionization. The aforementioned photo-ionization methods are generally restricted to Excimer laser systems. In a high-power $CO_2$ laser system, both electron-beam sustained and pulse-enhanced pre-ionization methods are exclusively used. In an electron-beam sustained discharge system, there is a need to separate lasing chamber from electron gun which produces electron beam. Since electron gun must be separated from lasing chamber because of the operating pressure difference, the separation is mechanically difficult. Because of these difficulties, pulse-enhanced pre-ionization methods are used for high power gas laser systems. Initial uniform pre-ionization in the discharge chamber creates a downstream instability because of the difference in ionic density between upstream and downstream side of discharge chamber. The difference in ionic density results from the additional ionization of gas molecules by the sustainer power during lasing operation.

In many systems, particularly transversely excited high power gas lasers, while the number of molecules available for ionization at the upstream end of the discharge chamber is relatively satisfactory, the flow of the gas through the chamber which is required for a continuous discharge gives rise to a non-uniform distribution of ions in the discharge chamber with a substantially greater number of ions at the downstream end. This increases the propensity for the discharge to break down with the result that arcing occurs between the electrodes at the downstream end of the chamber.

Yet a further problem in previous lasers has been to cool the electrodes. Electrodes generate a large amount of heat during discharge which must be dissipated not only to reduce the energy level of the unexcited molecules in the discharge chamber but also to reduce the wear of the electrodes and their arcing tendency. Many cooling techniques have been used such as circulating coolant around and within the discharge electrodes. These techniques, however, have been less than successful with the result that, as time goes by, electrodes continue to degenerate, arcing and wear again become problems.

Utilization of a forced-vortex flow and its application to a gaseous lasing medium has been described by Zerr in U.S. Pat. No. 4,612,646 dated Sept. 16, 1986. The Zerr system has a tangential gas inlet at one end of the chamber and a gas diffuser at the other end so that a forced-vortex will be established within the discharge chamber. In this system, however, the tangential velocity of gas flow is gradually changed as the gas travels towards the exit of the discharge chamber, resulting in non-uniformity within the discharge chamber which results in the concomitant arcing and discharge breakdown.

SUMMARY OF THE INVENTION

According to one aspect of the invention, there is disclosed a laser comprising a housing, a cylindrical discharge chamber in said housing and a plurality of first electrodes mounted in said housing and extending intermittently substantially the length of said discharge chamber.

According to a further aspect of the invention, there is provided a laser comprising a housing, a discharge chamber in said housing, a plurality of first electrodes mounted in the periphery of said housing and extending substantially the length of said discharge chamber and an electrode of opposite polarity to said first electrode in the form of a coil extending lengthwise in said discharge chamber and having an axis substantially coincident with the axis of said housing, the periphery of said coil being located adjacent said plurality of first electrodes.

According to yet a further aspect of the invention, there is provided a laser comprising a discharge chamber, gas inlet means on the periphery of the upstream end of said discharge chamber, first and second gas outlets located at the downstream and upstream ends of said discharge chamber, respectively, said gas inlet means being substantially tangential to the periphery of said discharge chamber.

According to yet a further aspect of the invention, there is disclosed an optics system for a laser having a cylindrical discharge chamber and being operable to obtain an axial discharge, said optics system comprising a conical reflective mirror located downstream in said discharge chamber symmetrically about the longitudinal axis of said discharge chamber, a cylindrical reflective mirror mounted about the inside periphery of said discharge chamber and being substantially transversely opposed to the conical reflective mirror and a partially reflective window located upstream in said discharge chamber and being symmetrical about the longitudinal axis of said discharge chamber.

According to yet a further aspect of the invention, there is disclosed an optics system for a laser, said laser having a cylindrical discharge chamber and being operable to obtain a transverse discharge, said optics system comprising a first annular reflective mirror mounted about the periphery of the upstream end of said discharge chamber, a second angularly oriented annular reflective mirror mounted about the periphery of the downstream end of said discharge chamber, a conical reflective mirror mounted downstream and symmetrically about the longitudinal axis of said discharge chamber and substantially radially opposed to said second angularly oriented annular reflective mirror and a window located upstream and symmetrically about the longitudinal axis of said discharge chamber.

According to yet a further aspect of the invention, there is disclosed an optics system for a laser having a conically shaped discharge chamber, said optics systems comprising a first annular mirror mounted about the upstream end of said discharge chamber and a window mounted symmetrically about the longitudinal axis of the downstream end of said discharge chamber.

BRIEF DESCRIPTION OF THE SEVERAL VIEWS OF THE DRAWINGS

An embodiment of the invention will now be described, by way of example only, with the use of drawings in which:

FIG. 1B is a sectional view of a laser similar to FIG. 1A but being a lower power laser and having a longitudinal discharge;

FIG. 1C is a partial schematic view of a resistively ballasted electrode system according to the invention;

FIG. 2 is a sectional view similar to FIG. 1 but illustrating a conical discharge chamber;

FIGS. 5A–5F illustrate a plurality of optical configurations with some specific mirrors and windows that are used in the laser according to the invention.

DESCRIPTION OF SPECIFIC EMBODIMENT

In the explanation of the operation of the laser according to the invention that follows and, indeed, in the preceding discussion, it is believed that the theory set out is correct to the best of the inventors knowledge. Nevertheless, some of the theory may be speculative in view of the continuous advances in the art and, therefore, the explanations set forth herein may well be modified, superseded or found to be incorrect in the future. The applicant, therefore, would not want to be bound by the descriptions given herein which are, however, as stated, believed to be complete and correct at the present date.

Figure 1A:
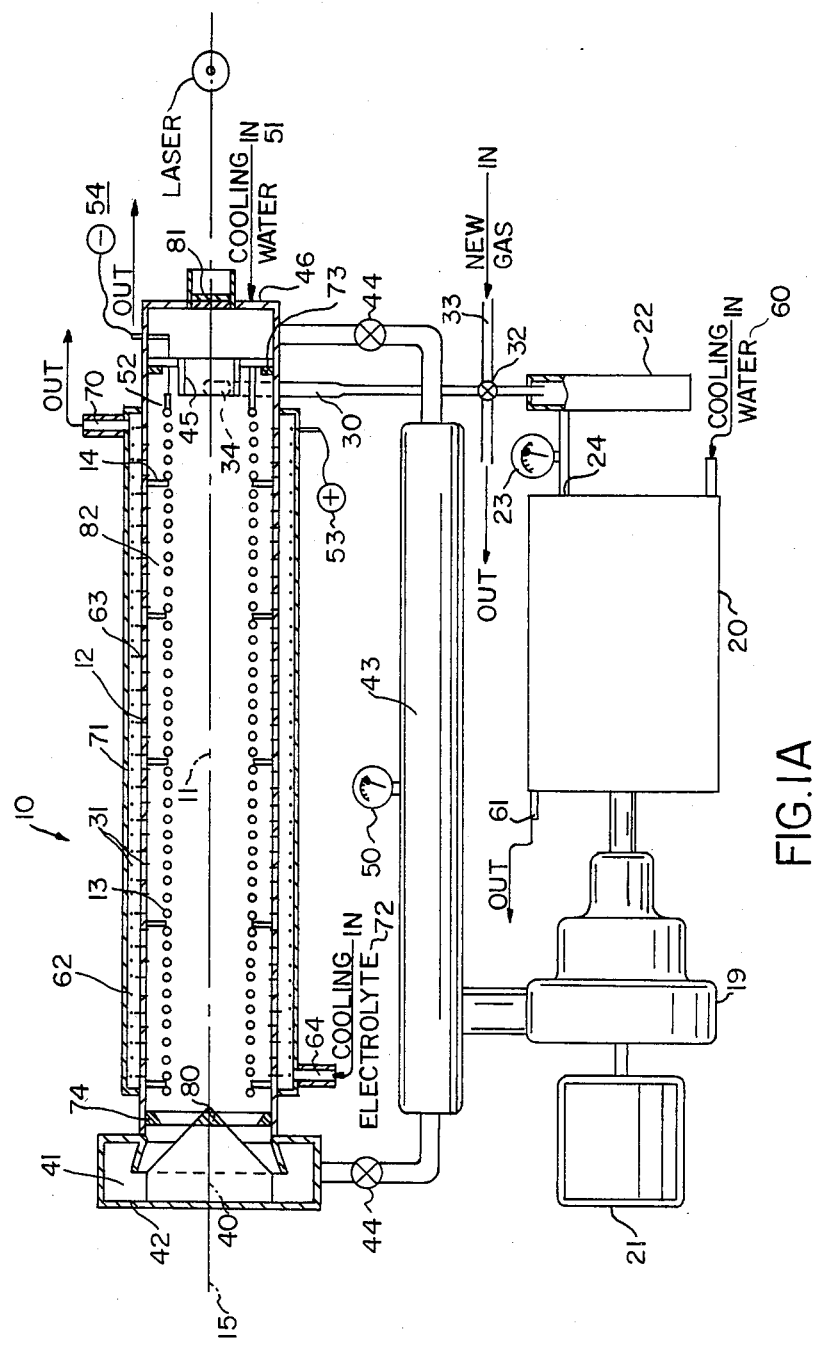
FIG. 1A is a sectional view of a laser according to the invention.

Referring now to the drawings, a laser is illustrated generally at 10 in FIG. 1A. It comprises a cylindrical laser or discharge chamber generally illustrated at 11 within a cylindrical housing 31 with a plurality of positive or anode and negative or cathode electrodes 12, 13, respectively, mounted in the housing 31 and extending substantially the length of the laser or discharge chamber 11. The cathode electrode 13 is in the form of a hollow coil which extends the length of the discharge chamber 11 and has an axis 15 substantially coincident with the axis of the housing 31. The periphery of the coil 13 is located adjacent the anode pin electrodes 12 and its diameter is substantially constant throughout the length of the discharge chamber 11. A multi-stage high pressure pump or blower 19 and a heat exchanger 20 are provided for the as used and circulated in the laser 10. A hydraulic motor 21 is connected to the blower 19 and a filter 22 is connected to the heat exchanger 20 with a pressure gauge 23 mounted on the line connecting the heat exchanger 20 and the filter 22. A gas infeed pipe 30 extends from the filter 22 to the laser housing 31 which retains the anode pins or positive electrodes 12. A control valve 32 is mounted in the gas infeed pipe 30 to allow adjustment in the rate and volume of gas flow from the filter 22.

Figure 3:
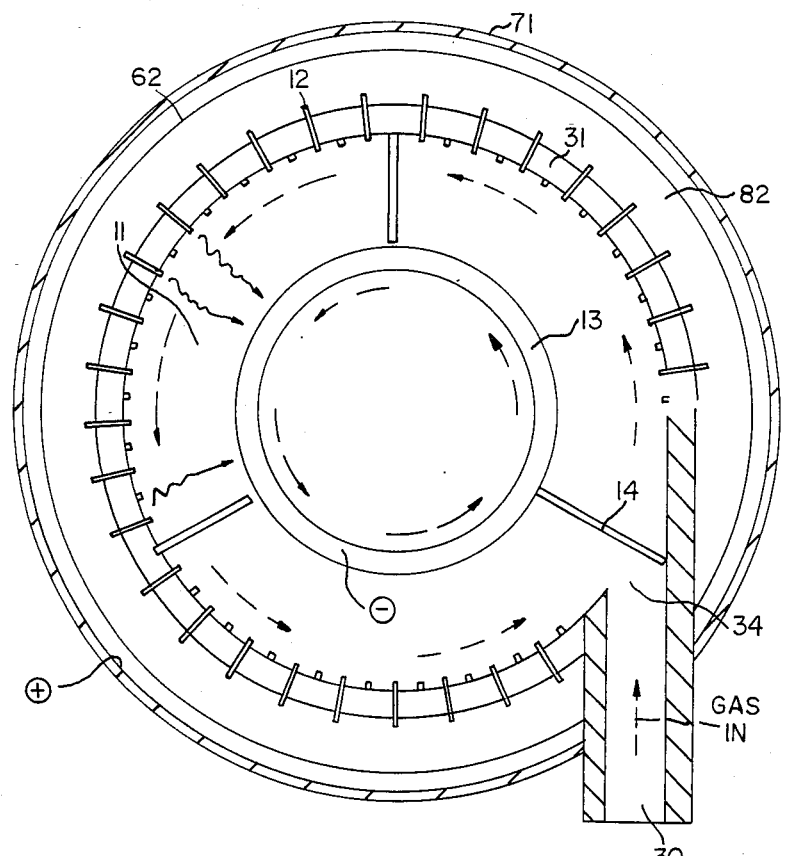
FIG. 3 is a sectional view taken along III—III of FIG. 2 and specifically illustrating the gas inlet of the discharge chamber.

The gas infeed pipe 30 extends from the filter 22 to the housing 31 and opens to the housing 31 at an entranceway 34. As best seen in FIG. 3, the entranceway or gas inlet 34 of the gas infeed line 30 is substantially tangential to the periphery of the upstream end of the discharge chamber 11 and the inside circumference of the housing 31.

At the downstream end of the housing 31 (FIG. 1A), a circumferential and conical flow divider 40 which smoothly diverges from its upstream to its downstream position is located within a gas exit housing 42 which surrounds the conical flow divider 40. A portion of the gas introduced through the entranceway 34 leaves the laser chamber 11 by the gas exit circumference area 41 around the flow divider 40 which terminates in the gas discharge housing 42. A circumferential flow guide 45 is positioned at the upstream end of the laser chamber 11 together with an upstream gas outlet or exit housing 46 which collects the gas returning to the upstream end of the laser chamber 11, which gas then exits to a low pressure manifold 43. This exit is centrally located about the longitudinal axis of the discharge chamber 11. A low pressure gauge 50 is connected to the low pressure manifold 43. Control valves 44 regulate the quantity of gas exiting from the upstream and downstream gas discharge housings 46, 42, respectively.

A cooling jacket 71 is provided for cooling the laser housing 31. A coolant inlet 64 is located to enter at the downstream end of the laser chamber 11 of the cooling jacket 71 as indicated. A coolant outlet 70 for the cooling jacket 71 is located at the upstream end of the laser housing 31.

The anode tube 62 is in the form of a coil and is designed to extend circumferentially close to the inside wall of the cooling jacket 71 along its length. Electrical power to the anode tube 62 is supplied at the upstream end of the laser housing 31 by positive voltage source 53. The voltage to the anode pin electrodes 12 is regulated by way of one of two techniques. The first technique, as illustrated in FIG. 1A, is by way of a electrolyte ballasting system. It utilizes the electrolyte both as a coolant and as a power transfer medium between the anode tube 62 and the anode pin electrodes 12.

The second technique, namely the resistively ballasted electrode method, is illustrated in FIG. 1C. In this technique, a series of resistors 35 and condensors (not shown) are located between the voltage source 53 and the anode pin electrodes 12. In utilizing the resistively ballasted method, an electrically insulating oil such as transformer oil is used to provide effective cooling.

A second embodiment for particular use in a lower power gas laser system is shown in FIG. 1B. In this embodiment, the anode 12 and cathode 13 are located at opposite ends of the discharge chamber 11, so that the electrical discharge takes place axially in the discharge chamber 11 and close to its longitudinal axis rather than radially as is the case with the embodiment illustrated in FIG. 1A.

A further embodiment using radial discharge similar to FIG. 1A is illustrated in FIG. 2. In this embodiment, a conical housing 31 which results in a conical discharge chamber 11 is utilized and the anode coil 62 and cathode tube 13 remain in a coil type configuration with a decreasing diameter as the downstream end of the laser 10 is approached. In a conical discharge chamber, the flow divider 40 in FIG. 1A is not needed at the down stream end of the discharge chamber 31 because the back pressure needed to create the backpressure vortex is inherently provided by the sloped discharge chamber 31. In this embodiment, the diameter of the periphery of the coil or cathode tube 13 decreases as the discharge chamber 11 is traversed.

There are several different optics systems for use in the three laser embodiments described. The optics system used with the low power cylindrical shaped laser housing 31 according to FIG. 1B which utilizes an axial or longitudinal discharge is shown in FIG. 5A. A cylindrical 100% reflective mirror 75 and a conical 100% reflective mirror 80 located downstream are used, the latter mirror forming part of the conical flow divider 40 (FIG. 1B). A partially reflective window 81 is located at the upstream end of the laser chamber 11 symmetrically about the longitudinal axis of the discharge chamber. This window 81 is the window through which the laser beam is extracted.

FIGS. 5B, 5C and 5D illustrate the optic systems contemplated for a medium to high power range cylindrical laser systems in which the electrical discharge takes place radially or transversely as shown in FIG. 1A. Referring initially to FIG. 5B, a 100% reflective annular shaped mirror 73 with a small concave curvature is mounted about the periphery of the upstream end of the discharge chamber with a 45° angle 100% reflective annular mirror 74 and a conical 100% reflective mirror 80 being located downstream and acting as the flow divider 40 which conical mirror is substantially radially opposed to the downstream annular mirror 80. A partially reflective window 81 is located upstream. This window 81 is the window through which the laser beam is extracted.

FIGS. 5C and 5D illustrate optics systems contemplated to be appropriate for a high power laser in which an unstable resonator optics design is employed. A 100% reflective annular mirror 92 has a concave surface while the surface of mirror 93 is divided into two areas, namely an outer convex area 94 and an inner 45° angle area 95. A conical mirror 80 which acts as a flow divider 40 and a totally transparent output window 85 are mounted at the downstream and upstream ends, respectively, of the laser 10. The difference between the two configurations is that the mirror 93 in FIG. 5D has a form that does not interfere with the gas flow and is located outside the inner diameter of the discharge chamber 11.

FIGS. 5E and 5F illustrate two optics configurations for the conical discharge chamber laser of FIG. 2. The FIG. 5E embodiment is used for a medium power laser and has a 100% reflective annular mirror 96 at the upstream end and a partially reflective window 97 at the downstream end. FIG. 5F is appropriate for a high power laser with an unstable resonator optics design and has a 100% reflective concave mirror 87 at the upstream end and an annular 100% reflective convex mirror 88 and a transparent window 89 at the downstream end.

OPERATION

In the explanation given herein, when a reference is made to the upstream end of the laser 10, such a reference refers to the end where the gas inlet to the discharge chamber 11 is located and a reference to the downstream end is opposed to the upstream end. Likewise, a reference to radial or transverse direction is a reference to a direction normal to the axis of the discharge chamber of the laser 10.

In the operation of an electrolyte ballasted discharge system and it will be assumed FIG. 1A teaches such a system, the electrolyte is initially circulated into the cooling jacket 71 by way of cooling jacket inlet 64 and, under pressure, it moves within cooling jacket 71 and leaves the jacket 71 at exit 70. The gas, simple or a mixture, is fed to the gas infeed line 33 and the control valve 32 is operated so as to allow the gas to travel through infeed pipe 30 to housing 31 where it enters the housing 31 tangentially through entranceway 34 as best seen in FIG. 3. Motor 21 and blower 19 are operated to provide the necessary gas flow through the discharge chamber 11. After the proper inlet and outlet gas pressures are obtained on the low pressure and high pressure gauges 50,23 respectively, the control valve 32 is operated to stop any introduction of new gas while leaving the gas free to circulate through filter 22.

After the correct pressure for the gas has been obtained as indicated by the pressure gauges 50, 23, cooling water is pumped into the cathode tube 13 by way of water inlet 51 travelling through the cathode tube 13 and exiting at outlet 52.

A high voltage pulse and D.C. sustainer power are then applied to cathode tube 13 and anode coil 62 and the electrolyte solution will transfer electric current between the anode coil 62 and the anode pin electrodes 12. The pre-ionization of gas in the discharge chamber 11 is accomplished by providing a high repetitive pulse of approximately 5000 cycle/sec. which is imposed along with D.C. sustainer power.

A glow discharge will then commence in the discharge chamber 11 between the anode pin electrodes 12 and the cathode tube 13. Circulating gas molecules within the discharge chamber 11 are bombarded by the steady flow of electrons travelling from cathode tube 13 to anode pin electrodes 12. This electron bombardment result in excitation of the gas molecules in the discharge chamber 11 so that continuous or pulsed lasing operation is possible. However, since only a fraction of the electrical energy is utilized for excitation of the molecules, the rest is simply used to heat the gas in the discharge chamber 11. Since high temperature is detrimental for effective lasing action, heat removal from the discharge chamber is necessary.

By embedding the anode pin electrodes 12 which are metal around the laser housing 31, the cooling electrolyte in the cooling jacket 63 assists in removing heat. Further, the heat generated at the cathode surface is effectively reduced by the direct flow of coolant through the cathode tube 13 from the downstream to the upstream end of the discharge chamber 11. In order to maintain a relatively uniform temperature throughout the entire length of the discharge chamber 11, the coolant is introduced at the downstream end where its temperature will be lower and the temperature of the chamber will be higher and subsequently, discharged at the upstream end of the laser housing 31 where the temperature of the chamber will be relatively lower.

The gas injected tangentially to laser housing 31 through entranceway 34 travels towards the downstream end of the laser housing 31 in an outer vortex configuration generally illustrated at 26 while maintaining its high speed. A portion of the gas escapes through the gas exit 41 of the discharge housing 11 and the remaining portion is reflected back towards the upstream end of the laser 10 forming a high speed circulating or backpressure vortex generally illustrated at 25 in the centre of the laser housing 31. The diameter of this vortex 25 will, of course, be smaller that the outer vortex 26 travelling downstream but the two vortices will rotate in the same direction. Because of this vortex action, heat transfer from the inner vortex region 25 to the outer vortex region 26 will occur so that the cooler gas escapes from the laser housing 31 through flow guide 45 which is located at the centre of the upstream side while the hot gas escapes through the gas exit 41 at the downstream end of the laser 10. Thus, this natural vortex action enhances the cooling efficiency of the laser.

There is a tendency for more ions to be present in the downstream end of the discharge chamber 11 than at the upstream end due to the downstream circumferential gas flow. Thus, there is an increased undesirable tendency for discharge breakdown and arcing to occur as the discharge chamber 11 is traversed. It is desirable, therefore, to control the pre-ionization throughout the discharge chamber 11 such that more pre-ionization occurs at the upstream end, which pre-ionization is gradually reduced as the downstream end of the laser housing 31 is approached. To this end, both the cathode tube 13 and the anode coil 62 are designed to act as inductor coils so that the impedance to the electrical pulse increases as the downstream end of the discharge chamber 11 is approached. The result will be less pre-ionization towards the downstream end while the number of ions produced by the D.C. sustainer power increases towards the downstream end. Thus, there is intended to be an equalization effect in the overall ionic density throughout the discharge chamber 11.

The gas molecules in the discharge chamber 11 are excited by the stream of electrons flowing from the cathode tube 13 to the anode pin electrodes 12 and photons are emitted when excited molecules or atoms return to their ground state. The various optic systems illustrated for the laser housings 31 are designed to maximize the extraction efficiency by the laser 10 of photons generated in the discharge chamber 11. Photons generated in the discharge chamber 11 are reflected by 100% reflective mirror 73, 74,80 and partially transparent window 81 (FIG. 5B) to build up the discharge strength. The partially transparent window 81 provides for the continuous emission of the coherent laser light.

An unstable resonator optic design which is used for higher power range gas lasers is shown in FIGS. 5C and 5D. In these embodiments, the 100% reflective mirror 92 is concave while the outer portion 94 of mirror 93 is convex and the inner portion 95 is formed at a 45° angle. After light resonates between the mirrors 92,94, the laser light makes one amplification pass and is then deflected by mirror 95 and conical shape mirror 80 to be finally emitted through totally transparent window 85.

The optic system of FIG. 5D is similar to that of FIG. 5C the 100% reflective mirror 93 is of a different configuration as earlier described.

Referring now to the FIG. 2 embodiment, laser 10 shares several common elements with the laser 10 described in association with FIGS. 1A and 1B except that the laser housing 31 is of conical configuration which decreases in diameter as the housing 31 is traversed from the upstream to the downstream end. The principal advantage provided by this configuration is that the circulating gas will be revolving at a much faster velocity at the narrower end of the discharge chamber 11 and, therefore, there is a tendency to reduce the instability of electrical arc formation at the downstream end of the discharge chamber 11 due to the rapid movement of the molecules. The FIG. 2 embodiment similarly, however, teaches the introduction of gas tangentially through gas inlet pipe 30 and entranceway 34.

Figure 4A:
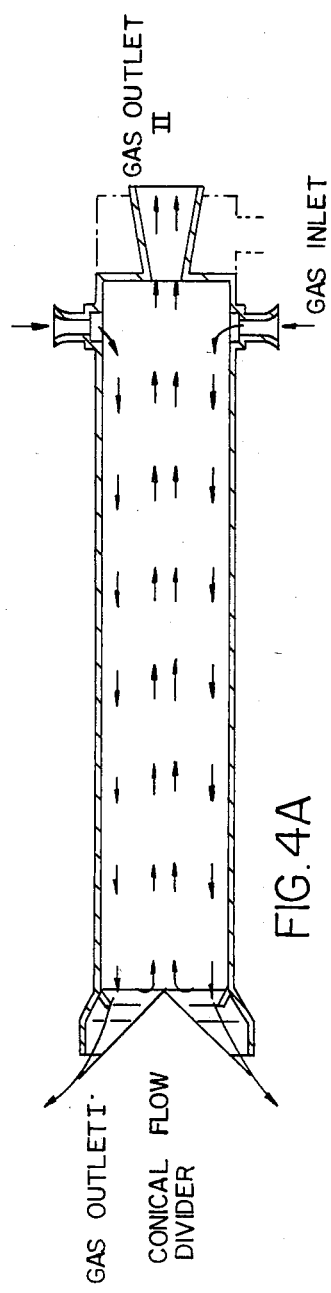
FIG. 4A is a sectional diagrammatic view of a laser according to the invention illustrating the gas flow in a cylindrical discharge chamber.
Figure 4B:
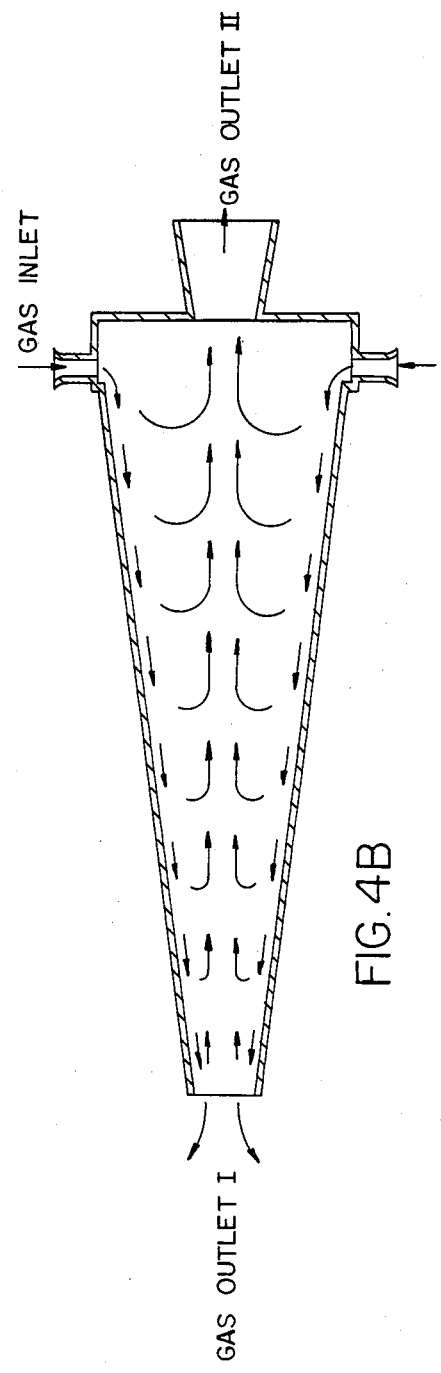
FIG. 4B is a view similar to FIG. 4A but illustrating the flow in a conical discharge chamber.

In a typical operation of the system shown in FIG. 1A, the pressure difference between the low and high pressure gauges 50,23 is maintained in a 1:4 ratio. In utilizing this pressure difference, the vortex flow in the discharge chamber 11 appears to be at a desirable maximum. Once the vortex flow is established in the discharge chamber 11 as diagrammatically seen in FIGS. 4A and 4B and as earlier described, there is a transfer of heat from the inner vortex outwardly so that relatively hot gas escapes from the downstream end 29 while relatively cooler gas escapes from the upstream end exit housing 46. Tangential velocity of the gas within discharge chamber 11 is maintained at a reasonable value throughout the system by the back pressure exerted from the surface of conical flow divider 40 at the downstream end of the discharge chamber 11.

In practise, a gas laser system according to the invention was constructed using a 5" diameter and 3' long ceramic tube. Into this system it was possible to deposit more than 15 KW of energy without incurring instability in the discharge chamber.

It is contemplated that many modifications may be made to the apparatus disclosed in the present specification. For example, while the specific embodiment of the transverse discharge laser contemplates a cathode coil and anode pin electrodes, under certain conditions it may well be useful to utilize an anode coil and cathode pin electrodes. Similarly, the cathode tube 13 need not be hollow if the cooling created by the coil 13 in such a configuration is not required but, rather, could be solid.

Yet a further modification contemplated would be mounting cathode pins directly to the cathode coil 13 and positioning the pins directly apposite the anode pin electrodes. This is considered to be a precautionary measure since arcing may damage the cathode.

Yet a further modification contemplated is to replace the cathode coil entirely with a cylinder, preferably being hollow to allow cooling liquid to flow therethrough. pin electrodes would be mounted on the periphery of the cylinder, each being positioned opposite its counterpart pin electrode in the housing 31.

Yet a further modification relate to enhanced cooling in the axial discharge laser illustrated in FIG. 1B. Because the housing 31 is an insulator, the heat carried away by the fluid in cooling jacket 63 is relatively little when compared to the heat that may be carried away by a housing 31 in the form of a conductor. To enhance the cooling, it is contemplated that metal buttons 27 could be used to assist the heat transmission from the discharge chamber 31 to the coolant in the cooling jacket 63.

Many other changes to the specific embodiments described may readily occur to those skilled in the art and the descriptions contained herein should be taken to be illustrative of the invention only and not as limiting its scope as construed in accordance with the accompanying claims.

I claim:

1. A gas laser discharge tube, comprising:
   (a) a tubular housing having an internal discharge chamber with a first end and a second end opposite the first end;
   (b) a plurality of first electrodes mounted on the housing within the chamber, the first electrodes having a spaced-apart relationship with each other over an area of the housing extending substantially the distance between the ends of the discharge chamber;
   (c) a second electrode having a coil shape within the chamber extending substantially the distance between the ends of the discharge chamber, being spaced-apart from the first electrodes and having opposite polarity to the first electrodes.

2. A discharge tube as claimed in claim 1, wherein the first electrodes are pin electrodes.

3. A discharge tube as claimed in claim 1, wherein the housing is cylindrical.

4. A discharge tube as claimed in claim 3, wherein the second electrode has a substantially constant peripheral diameter between the ends of the chamber.

5. A discharge tube as claimed in claim 1, wherein the housing is conical.

6. A discharge tube as claimed in claim 5, wherein the second electrode has a peripheral diameter which tapers in conformance with the housing.

7. A discharge tube as claimed in claim 1, further including means for distributing discharge between the second electrode and each of the first electrodes.

8. A discharge tube as claimed in claim 7, wherein the means for distributing includes a body of electrolyte operatively contacting each of the first electrodes so current conducted by the first electrodes passes through the electrolyte, thereby limiting the discharge between the second electrode and each of the first electrodes.

9. A discharge tube as claimed in claim 7, wherein the means for distributing includes a resistor connected in series with each of the first electrodes, thereby limiting the discharge between the second electrode and each of the first electrodes.

10. A discharge tube as claimed in claim 7, further including a cooling jacket extending about the housing having a liquid coolant therein, the coolant operatively contacting the first electrodes so discharges through the first electrodes pass through the coolant.

11. A gas laser discharge tube apparatus, comprising:
    (a) a tubular housing having an internal discharge chamber with a central, longitudinal axis, a first end and a second end which is opposite the first end;
    (b) a plurality of first pin electrodes projecting internally from the housing within the chamber in spaced-apart relationship to each other over an area of the housing extending substantially the distance between the ends of the discharge chamber;
    (c) a second electrode having opposite polarity to the first pin electrodes, the second electrode being coil-shaped and extending generally along the longitudinal axis of the chamber, the first pin electrode; and
    (d) means for distributing discharge between the second electrode and each of the first pin electrodes.

12. A discharge tube apparatus as claimed in claim 11, further comprising a cooling jacket extending about the housing in spaced-apart relationship to form a space between the housing and the cooling jacket, and a liquid coolant in the space.

13. A discharge tube apparatus as claimed in claim 12, wherein the means for distributing comprises said coolant, said coolant being an electrolyte operatively contacting said first electrodes, so current discharged through the first pin electrodes is conducted by the coolant.

14. A discharge tube apparatus as claimed in claim 12, wherein the means for distributing includes a resistor in series with each of the first pin electrodes.

15. A discharge tube apparatus as claimed in claim 14, wherein the coolant is an insulating oil.

* * * * *

UNITED STATES PATENT AND TRADEMARK OFFICE
CERTIFICATE OF CORRECTION

PATENT NO. : 4,807,242

DATED : February 21, 1989

INVENTOR(S) : Simon M. Kim

It is certified that error appears in the above-identified patent and that said Letters Patent is hereby corrected as shown below:

Title page:

In the Abstract, line 9     Change "instroduction" to --introduction--

Col. 4, line 5     Change "as" to --gas--

Col. 8, line 52     Change "apposite" to --opposite--

Col. 8, line 58     Change "pin" to --Pin--

Col. 10, line 25     After "pin" insert --electrodes being spaced-apart from the second--

Signed and Sealed this

Thirty-first Day of July, 1990

Attest:

HARRY F. MANBECK, JR.

*Attesting Officer*     *Commissioner of Patents and Trademarks*